United States Patent [19]

Hirasawa

[11] Patent Number: 5,341,363
[45] Date of Patent: Aug. 23, 1994

[54] COMPUTER SYSTEM CAPABLE OF DISCONNECTING ITSELF FROM A LAN

[75] Inventor: Yutaka Hirasawa, Tokyo, Japan

[73] Assignee: Kabushiki Kaisha Toshiba, Kawasaki, Japan

[21] Appl. No.: 879,948

[22] Filed: May 8, 1992

[30] Foreign Application Priority Data

May 10, 1991 [JP] Japan ............... 3-105443

[51] Int. Cl.$^5$ ............... H04J 1/16; H04J 3/14
[52] U.S. Cl. ............... 370/13; 370/85.3
[58] Field of Search ............... 370/13, 16, 16.1, 85.3, 370/94.1, 95.3, 85.13, 85.1; 371/8.1, 8.2, 11.2, 20.2; 379/1-2

[56] References Cited

U.S. PATENT DOCUMENTS

| | | | |
|---|---|---|---|
| 4,593,154 | 6/1986 | Takeda et al. | 370/16.1 |
| 4,700,344 | 10/1987 | Kaino et al. | 370/13 |
| 4,701,910 | 10/1987 | Ulug | 370/13 |
| 4,779,261 | 10/1988 | Yamagishi et al. | 370/16 |
| 4,825,435 | 4/1989 | Amundsen et al. | 370/85.1 |
| 4,847,837 | 7/1989 | Morales et al. | 370/16 |
| 5,016,243 | 5/1991 | Fite | 370/16 |
| 5,153,874 | 10/1992 | Kohno | 370/13 |

Primary Examiner—Douglas W. Olms
Assistant Examiner—Chau T. Nguyen
Attorney, Agent, or Firm—Oblon, Spivak, McClelland, Maier & Neustadt

[57] ABSTRACT

A computer system connected to a LAN is provided with a failure detecting section that detects a network failure by checking received packets from the LAN for a particular packet that may cause or is causing a network failure, a logical connecting/disconnecting section for logically disconnecting the computer system from the LAN, in response to the detection of the failure at the failure detecting section, and an informing section for displaying a failure occurrence message on an input/output section. Also provided is a connection instructing section that issues a connection instruction to the logical connecting/disconnecting section according to the request input at the input/output section.

5 Claims, 4 Drawing Sheets

IP ADDRESS

| NETWORK ADDRESS | HOST ADDRESS |

FIG. 3A (PRIOR ART)

IP BROADCAST ADDRESS

| NETWORK ADDRESS | 1 1 1 —————————— 1 1 1 |

FIG. 3B (PRIOR ART)

IP BROADCAST ADDRESS

| NETWORK ADDRESS | 0 0 0 —————————— 0 0 0 |

FIG. 3C (PRIOR ART)

MAC ADDRESS

└— INDIVIDUAL/MULTIPLE IDENTIFYING BIT

"0" ----- INDIVIDUAL ADDRESS

"1" ----- MULTIPLE ADDRESS

FIG. 4 (PRIOR ART)

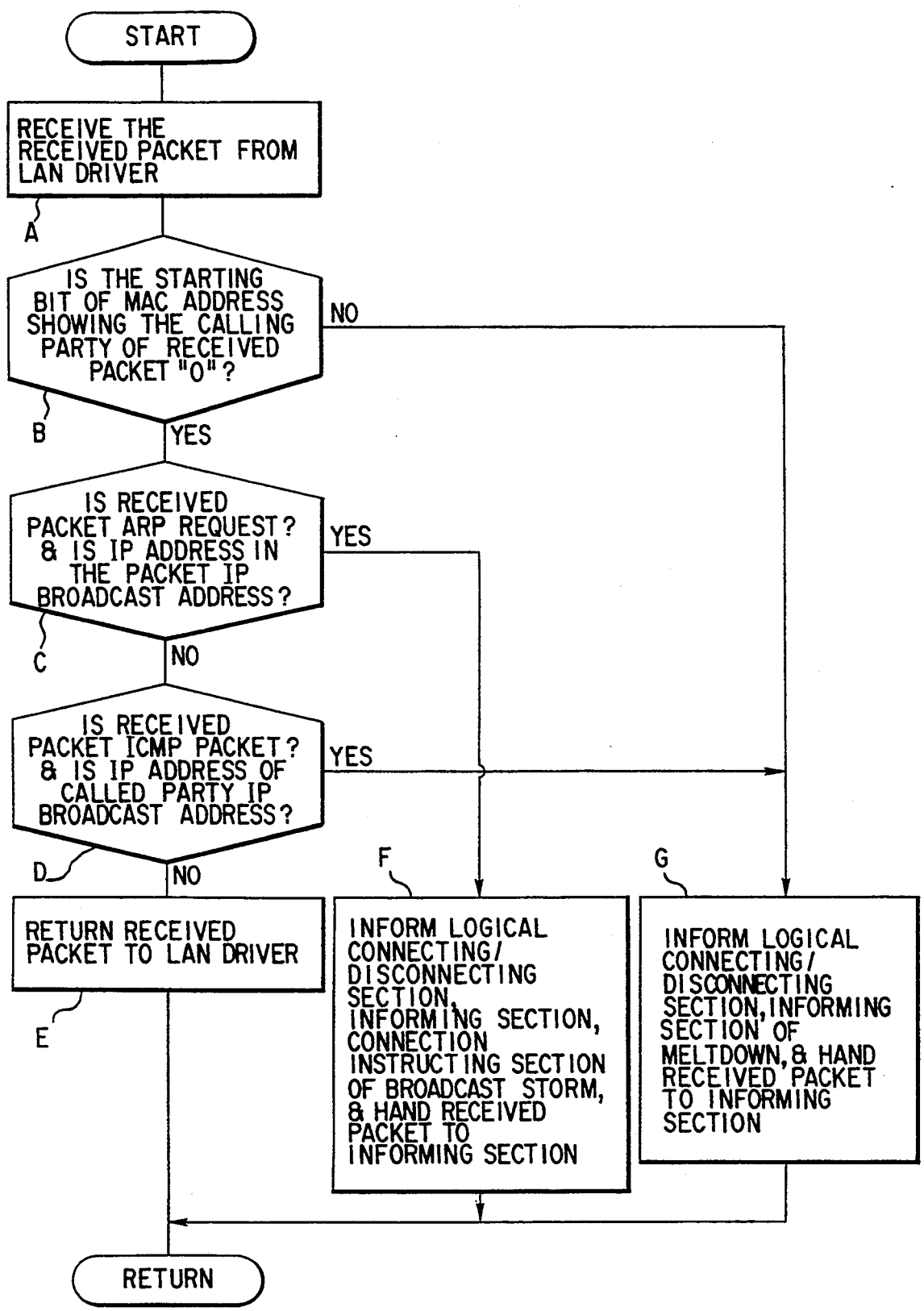
F I G. 5

COMPUTER SYSTEM CAPABLE OF DISCONNECTING ITSELF FROM A LAN

BACKGROUND OF THE INVENTION

1. Field of the Invention

This invention relates to a computer system connected to CSMA/CD (Carrier Sense Multiple Access/Collision Detection) LAN and capable of disconnecting itself from the LAN in case a failure takes place in the network.

2. Description of the Related Art

CSMA/CD LAN systems are generally able to transmit broadcast packets, which are addressed to all computers (devices) connected to the LAN.

Such a function, which is one of typical high-level protocols for the LAN, is essential to such as ARP (Address Resolution Protocol), ROUTED, and RWHO in TCP/IP (Transmission Control Protocol/Internet Protocol).

ARP is a protocol for calculating a MAC (media access control) address, an address on the LAN, from an Internet address (IP address), a network address (an address used to identify a device on TCP/IP) in TCP/IP. ROUTED is a program that enables the exchange of route control information between routers over a plurality of LANs. RWHO is a program that deals with information on users using the computer system.

In conventional LAN systems, however, broadcast packets sometimes develop abnormally due to mismatched settings for the network or defective programs, resulting in serious network failures.

It is known that there are two types of failures: one is called broadcast storm and the other, meltdown.

Broadcast storm is a state in which the temporary abnormal appearance of broadcast packets lowers transfer capabilities on the LAN or slows the response of the computer system to the terminals or the LAN.

Meltdown is an advanced stage of broadcast storm, or a state in which the transmission of packets develops into oscillation. Once a meltdown has occurred, there is no response from the computer system. The only way to get out of this situation is to start up all computer systems connected to the LAN.

Although the mechanism of developing such failures has been elucidated, any effective means of avoiding them has not been found yet.

As noted above, conventional CSMA/CD LAN systems using broadcast packets have the problem of permitting broadcast packets to appear abnormally, thus leading to network failures such as a broadcast storm or a meltdown.

Although how network failures including a broadcast storm and a meltdown take place has been cleared, there is no way of avoiding them. Therefore, once a network failure has occurred, each computer system connected to the network is forced to receive a large volume of meaningless broadcast packets and then to discard them. As a result of this, the computer system wastes some of its computing power on such useless jobs, degrading the processing capabilities it should have.

SUMMARY OF THE INVENTION

An object of the present invention is to provide a computer system that is able to inform the computer personnel of the failure whenever a network failure, such as the abnormal appearance of broadcast packets, has taken place, or its signs have appeared, and then logically disconnect itself from the LAN.

Another object of the present invention is to provide a computer system capable of logically connecting itself to the LAN after the network failure has been removed.

This invention is based on the fact that only particular packets develop network failures in CSMA/CD LANs based on a protocol using broadcast packets. The present invention is characterized by comprising: a failure detecting section for detecting a network failure by checking the packets on the LAN for a particular packet (a defective packet) causing a network failure; a logical connecting/disconnecting section for logically disconnecting the computer system from the LAN or logically connecting the computer system to the LAN, in response to the detection of a network failure at the failure detecting section; an informing section for informing the outside world of the network failure; a request entry section (such as, a timer or an input/output device) for requesting that the computer system be connected to the LAN from which the computer system was logically disconnected by the logical connecting/disconnecting section; and a connection instructing section for issuing a connection instruction to the connecting/disconnecting section in response to the connection request from the request entry section.

With this arrangement, since packets of a limited type alone might cause or are causing a network failure, the failure detecting section can detect the occurrence of a network failure or its sign by checking the packets flowing over the network for a particular packet (a defective packet).

If a network failure has been detected, the connecting/disconnecting section logically disconnects the computer system from the LAN, thereby enabling the computer system to continue executing the processes unrelated to the LAN.

In case that a network failure has occurred, it is notified to the outside world, which allows the computer personnel to know the occurrence of the network failure immediately. After the failure has been removed, the operator can enter a connection request from the request entry section to cause the connection instructing section to issue a connection instruction to the connecting/disconnecting section, which then connects the computer system to the network.

Providing a timer function for the connection instructing section allows a connection instruction to be issued after a specified period of time has elapsed since the detection of a network failure. This feature enables the computer system to automatically join the network and is useful particularly in recovering from a temporary network failure such as a broadcast storm.

As described in detail, with the present invention, based on the fact that packets of a limited type alone might cause or are causing a network failure, the packets flowing over the network are being checked for defective packets. This ensures that the occurrence of a network failure or its sign is detected properly. Since the computer system is logically disconnected from the LAN in case of detection of a defective packet, the computer system can continue performing the processes unrelated to the LAN without degrading its performance even after a network failure has occurred.

The present invention allows the computer personnel to be informed immediately of the detected network failure, enabling the personnel to take proper measures as soon as possible.

After the network failure has been removed, the present invention accepts a connection request from the computer personnel, and allows the computer system logically disconnected from the LAN to logically connect to the LAN again. Therefore, if a serious failure such as a meltdown should take place, the computer system can be reconnected to the network without restarting the computer system.

With this invention, by issuing a connection instruction after a specified period of time has passed since the detection of a network failure such as a broadcast storm, the computer system can be automatically connected to the network.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 3A to 3C are views used to explain the types of IP broadcast addresses;

FIG. 4 is an explanatory view of the format of an MAC address; and

FIG. 5 is a flowchart used to explain the operation of the failure detecting section 15 in the computer system 1 shown in FIG. 1.

DETAILED DESCRIPTION OF THE PREFERRED EMBODIMENT

Referring to the accompanying drawings, an embodiment of a computer system of the present invention will be explained.

Figure 1:
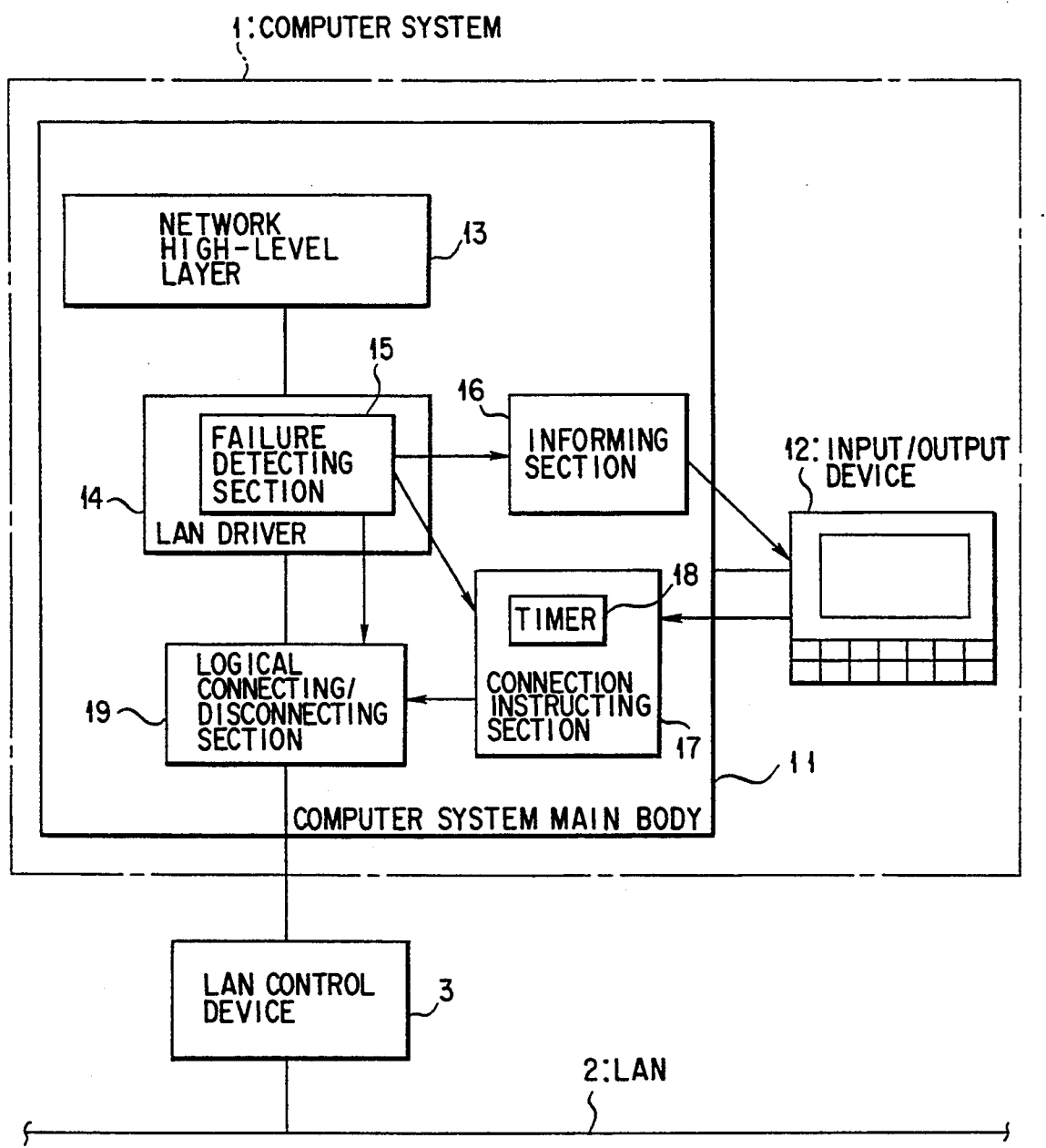
FIG. 1 is a block diagram of a computer system connected to CSMA/CD LAN according to an embodiment of the present invention.

FIG. 1 is a block diagram showing the structure of a computer system according to an embodiment of the present invention. In the figure, a fault-tolerant computer system 1 for use in, for example, control and CAD (computer-aided design) is connected to CSMA/CD LAN 2 using TCP/IP via a LAN control device 3. The LAN control device 3 supervises the transmission of packets to the LAN 2, the reception of packets from the LAN 2, and others. This control device 3 may be incorporated in the computer system 1.

The computer system 1 is made up of a main body 11 and an input/output device 12 connected thereto. The input/output device 12 informs the computer personnel of network failures detected by the main body 11 (exactly, a failure detecting section 15 of the main body) and allows the computer personnel to manually enter a logical connection request to connect the computer system 1 to the LAN 2.

The main body 11 is provided with a network high-level layer 13 for realizing network applications including TCP/IP protocol and higher ftp (file transfer protocols), a LAN driver 14 for requesting the LAN control device 3 to transmit or receive packets to or from the network high-level layer 13, and the failure detecting section 15. The failure detecting section 15 checks the packets, which the LAN driver 14 receives from the LAN control device 3, for network failures or their signs. The detecting section 15 may be incorporated in the LAN driver 14. It may be provided separately or built in the high-level network layer.

The main body 11 of the computer system is also provided with an informing section 16 for notifying the computer personnel of the failure by displaying a failure message on the input/output device 12 in response to the network failure detected at the failure detecting section 15, and a connection instructing section 17 for receiving a logical connection request from the input/output device 12 and then issuing a connection instruction to a logical connecting/disconnecting section 19 explained later. The connection instructing section 17 is provided with a timer 18 that is driven whenever a network failure (for example, a broadcast storm) has been detected by the failure detecting section 15. This section 17 also issues a connection instruction when the set time on the timer 18 has expired.

The main body 11 is further provided with the logical connecting/disconnecting section 19 for logically connecting or disconnecting the computer system 1 (exactly, the LAN driver 14) to or from the LAN control device 3. The logical connecting/disconnecting section 19, which is a logical switch, disconnects the computer system 1 from the LAN control device 3 when the failure detecting section 15 has detected a network failure. This section 19 also logically connects the computer system 1 to the LAN control device 3 in response to the connection instruction from the connection instructing section 17.

Using FIGS. 2 to 4, the mechanisms of broadcast storm and meltdown will be described.

Figure 2:
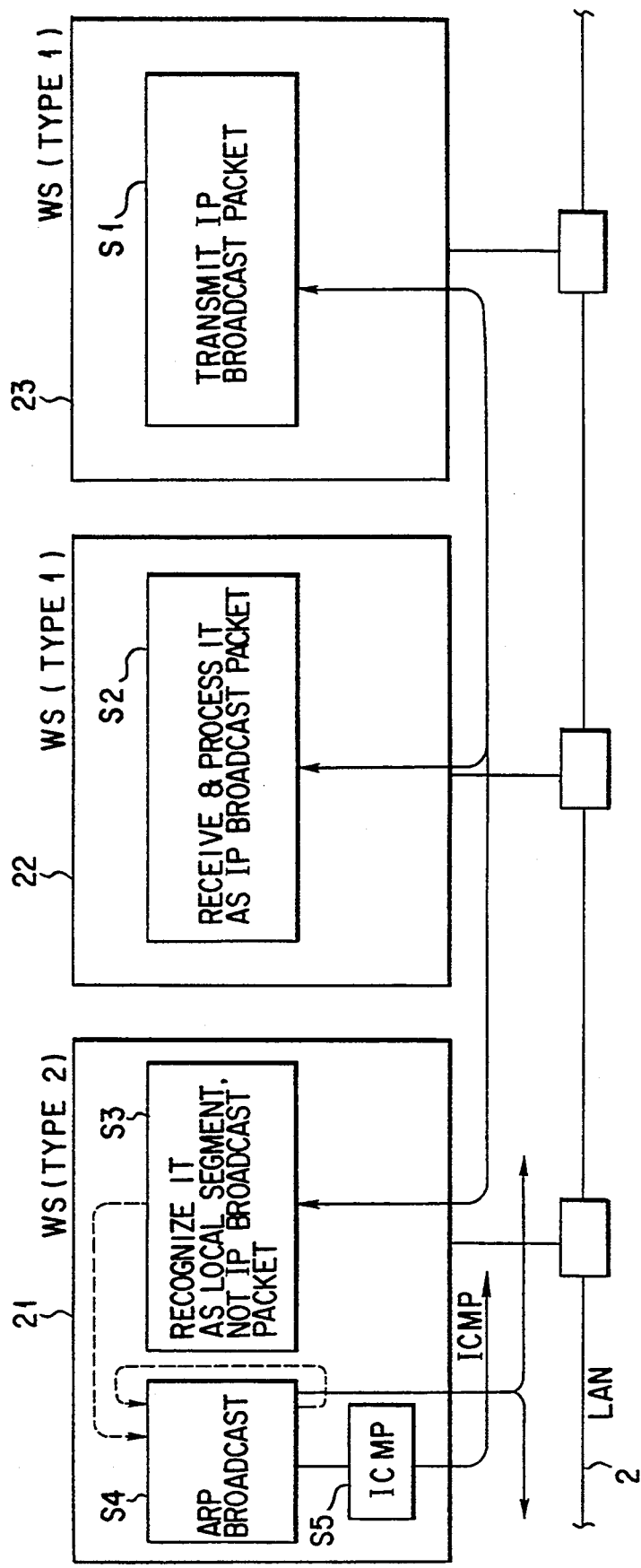
FIG. 2 is a view used to explain a broadcast storm in TCP/IP network on the LAN 2 of FIG. 1.

FIG. 2 is a view used for explanation of a broadcast storm in TCP/IP network on the LAN 2 of FIG. 1. For convenience of explanation, only computers (hereinafter, referred to as WSes) 21 to 23 connected to the LAN 2 are shown here.

In TCP/IP network, an address indicating the destination of a broadcast packet is called an IP broadcast address. IP broadcast addresses are generally divided into two types. Depending on the type of IP broadcast addresses used, WS21 to WS23 are grouped into type 1 and type 2. Those two types of IP broadcast addresses arise from the difference of the programs installed in the WSes. In this embodiment, it is assumed that WS22 and WS23 are of type 1, and WS21 is of type 2.

IP broadcast addresses will be explained, referring to IP address formats shown in FIGS. 3A to 3C.

IP address (Internet address), a network address in TCP/IP, basically consists of a network address as shown in FIG. 3A, and the address (host address) of a device (computer) connected to the network specified by the network address.

IP broadcast addresses in TCP/IP are broadly divided into IP addresses whose host address bits are all 1s as shown in FIG. 3B, and IP addresses whose host address bits are all 0s as shown in FIG. 3C. WS22 and WS23 of type 1 use IP broadcast addresses shown in FIG. 3B, while WS21 of type 2 uses IP broadcast addresses shown in FIG. 3C.

Another known IP address is constructed of a network address, a subnetwork address, and a host address, and is used in a LAN whose single network is composed of a plurality of subnetworks. Those IP broadcast addresses associated with IP addresses have two types: one whose host address bits are all 1s, and the other whose host address bits are all 0s. Therefore, there are four types of IP broadcast addresses in TCP/IP.

The mechanism of a network failure developing in the FIG. 2 LAN system will be described.

(1) It is assumed that WS23 of type 1 has transmitted IP broadcast packet as shown by reference character S1 in FIG. 2, using IP broadcast address shown in FIG. 3B.

(2) Receiving a packet from WS23, WS22 recognizes it as IP broadcast packet as shown by reference character S2 and then processes it, since WS22 of type 1 uses the same IP broadcast packet as WS23 does.

(3) In contrast, because WS21 of type 2 uses IP broadcast address different from one that WS23 uses, WS21 cannot recognize the packet from WS23 as IP broadcast packet. As a result, WS21 recognizes it inadvertently as a packet addressed to another computer as shown by reference character S3 in FIG. 2. In this case, WS23 attempts to route the packet.

(4) To find the MAC address (LAN address) of the called party, WS21 transmits onto the LAN 2 ARP request having IP address (actually, IP broadcast address) of the packet inadvertently recognized as one addressed to another computer, using IP broadcast packet with MAC level. This ARP request is received by all computers including WS21 and WS22 on the LAN 2.

There is no computer that has an address agreeing with IP broadcast address, so that any computer does not return ARP response. After WS21 has repeated ARP requests several to several ten times, it detects an error.

All WSes of type 2 on the LAN 2, including WS21 (that is, all computers using IP broadcast addresses different from ones that WS23 uses) repeat the aforementioned wasteful ARP requests. Thus, along the LAN 2, meaningless broadcast packet rush violently, which is known as a broadcast storm.

(5) After ARP request has ended in an error, WS21 places the error in a particular packet called an ICMP message as shown reference character S5 in FIG. 2, and then sends back the packet to the calling party. In the event that a program installed in WS21 has a particular defect, however, WS21 transmits an ICMP packet to the called party that could not receive the packet inadvertently, not to the calling party.

After such an ICMP packet has been transmitted as described above, all computers including WS21 and WS22 on the LAN 2 receive the ICMP packet because the called party is indicated by IP broadcast address. With this packet, existence of WS of type 2 such as WS21 permits the repetition of item (3) and later, meaning that the broadcast storm continues forever. This is known as a meltdown.

Another case where a meltdown develops is that the MAC address (individual address) of the computer has been accidentally changed to a broadcast address (multiple address). Specifically, an individual/multiple identifying bit to distinguish an individual address from a multiple address in the MAC address as shown in FIG. 4 ("0" indicates an individual address, and "1" a multiple address) has been changed accidentally from "0" to "1."

In this case, all packets are transmitted to the computer, using broadcast packet on the LAN, with the result that all other WSes start routing as described in item (3). The routing increases in geometrical progression and, in no time, reaches a saturated state. This state continues permanently.

The computer system of the present invention automatically detects the occurrence of the aforesaid network failure or its sign with the failure detecting section 15, and then logically disconnects itself from the LAN 2 connected to LAN control device 3. The operation of the computer system will be explained, using the flowchart of FIG. 5.

Receiving a packet flowing over the LAN 2, the LAN driver 14 of the computer system 1 transfers it to the failure detecting section 15. The failure detecting section 15, after receiving the received packet from LAN driver 14 (step A), detects a packet that indicates the cause of network failures such as a broadcast storm or a meltdown, or the occurrence of network failures in TCP/IP network.

Specifically, the failure detecting section 15 checks the starting bit (individual/multiple identifying bit) of the MAC address with the format shown in FIG. 4 (step B) to see if it is "0" (meaning an individual address), the MAC address indicating the calling party that transmitted the received packet. If it is "1," that is, if the MAC address indicating the calling party is a multiple address, the detecting section 15 informs the logical connecting/disconnecting section 19 and the informing section 16 of a meltdown, and then gives the received packet (the defective packet) to the informing section 16 (step G).

After having confirmed that the MAC address indicating the calling party is an individual address, the failure detecting section 15 checks the received packet to see if it is ARP request packet and IP address (Internet address) in the packet is one of IP broadcast addresses (step C). If true, the section 15 informs the logical connecting/disconnecting section 19, the informing section 16, and the connection instructing section 17 of a network failure (broadcast storm), and then hands over the received packet to the informing section 16 (step F).

If it is found at step C that the received packet is not ARP request packet, the failure detecting section 15 checks the received packet to see if it is ICMP packet and IP address of the called party is IP broadcast address (step D). If true, the section 15 informs the logical connecting/disconnecting section 19 and the informing section 16 of a network failure (meltdown), and then hands over the received packet to the informing section 16 (step G).

If it is found at step D that the received packet is not ICMP packet, or it is ICMP packet but IP address of the called party is not IP broadcast address, that is, if no network failure is not found in any of steps B to D, the failure detecting section 15 judges that there is no sign of network failures, and passes the received packet to the LAN driver 14 (step E). After this, the LAN driver 14 resumes normal processing.

The operation of the logical connecting/disconnecting section 19 will be described. After having been informed that the failure detecting section 15 has detected a network failure such as a meltdown or a broadcast storm, the logical connecting/disconnecting section 19 logically disconnects the computer system 1 from the LAN control device 3. This disconnection means that interruption from the LAN control device 3 are made invalid, or an instruction of the LAN driver 14 aiming at the LAN control device 3 is made invalid. Such logical disconnection can be realized by a program.

With a conventional computer system, in case that a network failure takes place, numerous, meaningless broadcast packets must be received and discarded as described earlier until the system is restored from the failure or the entire network system is restarted. This makes the computer inoperative or lowers its performance seriously. With the embodiment of this invention, however, if a network failure should occur, the failure detecting section 15 detects it, and the logical connecting/disconnecting section 19 automatically disconnects the computer system 1 from the LAN 2. Therefore, the computer system 1 cannot continue the processing associated with the LAN, but is able to execute processes independent from the LAN with the same performance as before the occurrence of the network failure.

The operation of the informing section 16 will be explained. After having been informed by the failure informing section 15 that a network failure such as a meltdown or a broadcast storm was detected and having received the packet (an erroneous packet) at that time, the informing section 16 allows the input/output device 12 to display a message that a network failure has occurred, and the packet transferred from the detecting section 15 (that is, the packet flowing over the LAN at that time).

Watching what is displayed on the screen of the input/output device 12, the computer personnel is able to learn that the computer system 1 has been logically disconnected from the LAN 2 and an urgent measure must be taken because of the existence of a network failure or its sign. They can know from the input/output device 12 that what packet actually flowed through the network, causing a network failure, and take effective measures.

An explanation will be given about the method of restoring the once-disconnected computer system 1 to its original state where it is connected to the LAN 2 (or the method of rejoining the computer to the network). In this embodiment, there are two ways of restoring the computer to its original state.

One method is related to a broadcast storm. Since a broadcast storm, which should not occur, is temporary, it is desirable to restore the computer to its original state after the phenomenon has disappeared. It is difficult, however, to predict how long it takes for the phenomenon to cease because it depends on the size of the network. To solve this problem, the present embodiment deals with a network failure as follows.

When the failure detecting section 15 has detected a broadcast storm, this section 15 informs the connection instructing section 17 of the occurrence of a broadcast storm. Receiving the information from the failure detecting section 15, the connection instructing section 15 actuates the timer 18.

When the set time on the timer 18 has expired, the connection instructing section 17 issues a connection instruction to the logical connecting/disconnecting section 19 to rejoin the computer system 1 to the network. This permits the logical connecting/disconnecting section 19 to logically connect the computer system 1 to the LAN control system 3 for restoration to its original state.

The timer value set for the timer 18 may be any suitable value. The reason for this is that if the broadcast storm still continues at the time when the set time expires, the failure detecting section 15 detects the failure again, thereby allowing the computer system 1 to be logically disconnected from the LAN 2.

The other method is related to a meltdown. The only way to eliminate a meltdown is to start up the network again. Thus, restoration to its original state is made as follows. When the network is restarted, the computer personnel operates the input/output device 12 so that a logical connection request is supplied to the connection instructing section 17 in order to allow the computer system 1 to join the network. Receiving the request from the input/output device 12, the connection instructing section 17 issues a connection instruction to the logical connecting/disconnecting section 19. Then, the logical connecting/disconnecting section 19 logically connects the computer system 1 to the LAN control device 3, thereby permitting the system 1 to rejoin the network.

When a meltdown takes place, the failure detecting section 15 may inform the connection instructing section 17 of this network failure. Then, the instructing section 17 starts the timer 18, and, when the set time on the timer 18 has expired, automatically issues a connection instruction to the logical connecting/disconnecting section 19. If the meltdown continues further, the computer system will be disconnected from the LAN 2 again.

While in the embodiment, the present invention is applied to a network with TCP/IP as a high-level protocol, it may be applied to networks with other protocols as long as those protocols use broadcast packets offered by the LAN.

This invention may be practiced or embodied in still other ways without departing from the spirit or essential character thereof.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer system connected to a CSMA/CD LAN with a protocol using broadcast packets, comprising:

failure detecting means for detecting a network failure including a broadcast storm and a meltdown of said CSMA/CD LAN by checking said broadcast packets on said CSMA/CD LAN for a defective broadcast packet causing the network failure;

connecting/disconnecting means for logically disconnecting said computer system from said CSMA/CD LAN in response to the network failure detected by said failure detecting means and logically connecting said computer system to said CSMA/CD LAN; and informing means for informing the network failure to an external device in response to the network failure detected by said failure detecting means;

wherein a broadcast storm is defined to be a failure where a first type of computer transmits a first packet having a first address, a second type of computer receives the packet and cannot recognize the first address, and the second type of computer transmits a subsequent packet in response to receipt of the first packet but no computer has an address corresponding to the address of the subsequent packet; and wherein a meltdown is defined to be a failure where the second computer continues to transmit subsequent packets but no computer has an address corresponding to the address of the subsequent packet.

2. A computer system according to claim 1, further comprising request entry means for requesting that said computer system be connected to said CSMA/CD LAN from which said computer system was disconnected by said connecting/disconnecting means in response to the network failure detected by said failure detecting means.

3. A computer system according to claim 2, wherein said request entry means includes at least one of timer means for issuing a request to connect said computer system to said CSMA/CD LAN after a specified time has elapsed; and manual inputting means for issuing a request to connect said computer system to said CSMA/CD LAN according to a connection request entered manually.

4. A computer system according to claim 2, further comprising connection instructing means for issuing a connection instruction to said connecting/disconnecting means in response to a connection request from said request entry means, in order to connect said computer system to said CSMA/CD LAN from which said computer system was disconnected by said connecting/disconnecting means in response to the network failure detected by said failure detecting means.

5. A computer system according to claim 4, wherein said connecting/disconnecting means contains means for logically disconnecting said computer system from said CSMA/CD LAN in response to the network failure detected by said failure detecting means, and means for logically connecting said computer system to said CSMA/CD LAN in response to a connection request from said connection instructing means.

* * * * *